United States Patent [19]

Sugitani

[11] 4,417,251

[45] Nov. 22, 1983

[54] INK JET HEAD

[75] Inventor: Hiroshi Sugitani, Machida, Japan

[73] Assignee: Canon Kabushiki Kaisha, Tokyo, Japan

[21] Appl. No.: 238,422

[22] Filed: Feb. 26, 1981

[30] Foreign Application Priority Data

Mar. 6, 1980 [JP] Japan ................................ 55-28654
Aug. 29, 1980 [JP] Japan ................................ 55-120272

[51] Int. Cl.[3] ........................................ G01D 15/18
[52] U.S. Cl. ................................ 346/1.1; 346/75; 346/140 R
[58] Field of Search .............. 346/140 PD, 140 R, 75, 346/1.1; 430/294, 320

[56] References Cited

U.S. PATENT DOCUMENTS

| | | | |
|---|---|---|---|
| 3,988,745 | 10/1976 | Sultan | 346/140 PD |
| 4,189,734 | 2/1980 | Kyser et al. | 346/1.1 |
| 4,205,320 | 5/1980 | Fujii | 346/140 PD |
| 4,296,421 | 10/1981 | Hara et al. | 346/140 PD |

*Primary Examiner*—G. Z. Rubinson
*Assistant Examiner*—W. J. Brady
*Attorney, Agent, or Firm*—Fitzpatrick, Cella, Harper & Scinto

[57] ABSTRACT

Ink jet head and method for manufacturing the same, wherein a groove or grooves to constitute ink flow path are formed in a layer of a photosensitive composition placed on one surface of a substrate.

23 Claims, 9 Drawing Figures

INK JET HEAD

BACKGROUND OF THE INVENTION

1. Field of the Invention

This invention relates to an ink jet head. More particularly, it is concerned with an ink jet head for producing droplets of recording ink used in a so-called "ink jet recording system".

2. Description of the Prior Art

The ink jet head to be adopted in the ink jet recording system is generally provided with a micro-sized ink discharging port (or orifice), an ink flow path, and an ink discharging pressure generating section provided in one part of the ink path.

As a method for fabricating such ink jet head, there is known one, for example, in which a very fine groove or grooves are formed in a glass or metal plate by cutting or etching, and then the plate having the groove or grooves formed therein is joined with an appropriate cover plate, thereby constructing the ink flow path.

When the ink jet head is fabricated by such conventional method, however, there are accompanying disadvantages such as strain occurring in the ink path due to a difference in the rate of etching making it difficult for the ink flow path to obtain a constant liquid flow resistance with the result being that fluctuations or irregularities tend to readily appear in the ink discharging characteristics from the finished ink jet head, or the plate tends to readily bring about breakage or cracks when cutting, resulting in poor yield in the fabrication, or, in the case of etching, an increased number of process steps would cause rise in the manufacturing cost. In addition, other common disadvantages in the conventional methods are that the grooved plate having the grooves which grooves are to be the ink flow paths are difficult to accurately join with the cover plate, on which various driving elements such as piezo-electric elements, heat generating elements, etc. are provided to generate energy to act on the ink, hence these conventional methods failed to provide for mass-production of ink jet heads. It has, therefore, been earnestly desired that ink jet heads free from these disadvantages are developed.

SUMMARY OF THE INVENTION

It is therefore an object of the present invention to provide an ink jet head free from the disadvantages as mentioned in the foregoing.

It is another object of the present invention to provide an ink jet head which is precise in construction, inexpensive to manufacture, and high in operating reliability.

It is still another object of the present invention to provide an ink jet head of a multi-head type suitable for industrialized mass-production.

It is yet another object of the present invention to provide an ink jet head, particularly a multi-head type ink jet head, which is precise in construction, inexpensive to manufacture, high in operating reliability, and suitable for industrialized mass-production.

It is other object of the present invention to provide a so-called multi-head type ink jet head of a construction in which a plurality of ink paths are juxtaposed with good precision, and these ink paths are worked to a fine and precise good yield.

According to the present invention, in one aspect thereof, there is provided an ink jet head having at least one ink flow path through which ink droplets are produced, which comprises a groove constituting the ink flow path and defined in a cured photosensitive composition.

According to another aspect of the present invention, there is provided an ink jet head having at least one ink flow path through which ink droplets are produced, characterized in that substantially the entire part of said ink flow path is formed by one and the same processing.

According to a further aspect of the present invention, there is provided an ink jet head having at least one ink flow path through which ink droplets are produced which comprises (1) a substrate and (2) a layer overlying the substrate provided with at least one groove for the ink flow path prepared by forming a photosensitive composition layer on the substrate, curing said layer to form cured regions according to a predetermined pattern and removing the uncured composition from said layer.

According to still another aspect of the present invention, there is provided a method for manufacturing an ink jet head having at least one ink flow path through which ink droplets are produced which comprises: forming a photosensitive composition layer on a substrate, producing cured regions in said layer according to a predetermined pattern, and removing uncured composition from said layer to produce a groove constituting each of the ink flow paths on the surface of the substrate.

BRIEF DESCRIPTION OF THE DRAWINGS

FIGS. 1 through 7 illustrate the process steps for manufacturing the ink jet head in accordance with a preferred embodiment of the present invention, wherein

DESCRIPTION OF THE PREFERRED EMBODIMENTS

In the following, the present invention will be explained in detail with regard to the preferred embodiment thereof in reference to the accompanying drawing.

FIGS. 1 through 7 are schematic diagrams in perspective and cross-section for explaining the structure of the ink jet head and process steps for manufacturing the same in accordance with the present invention.

Figure 1:
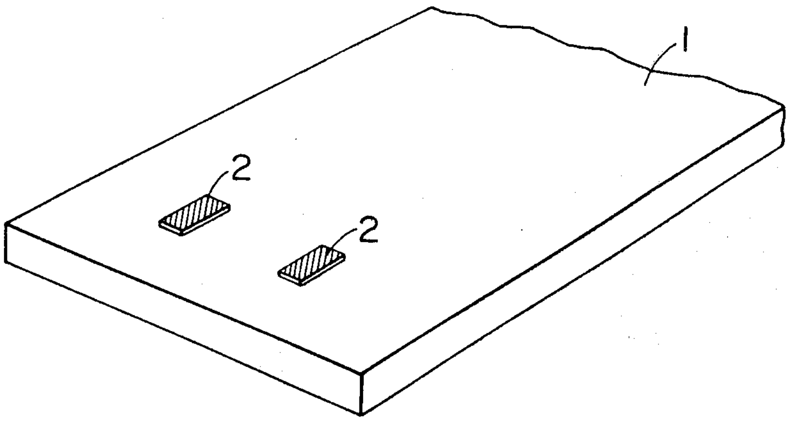

Referring first to FIG. 1, an ink discharging pressure generating element 2 such as heat generating element, piezoelectric element, or the like, is disposed in desired numbers on an appropriate base plate (or substrate) 1 made of glass, ceramics, plastics, metals, or the like. (In the illustration, two pieces of such element are provided.) When the heat generating element is used as the ink discharging pressure generating element 2, the ink discharging pressure is generated by this element heating the ink in its vicinity. When the piezoelectric element is used, the ink discharging pressure is produced by mechanical vibration of this element. Incidentally, it is to be understood that an electrode for signal input is connected to this element 2 although it is not shown in the drawing. Such electrode to be associated with the element 2 (not shown) is usually provided on the substrate 1 substantially simultaneously with provision of the element 2, or is connected to the element 2 after the head is completely assembled.

Figure 2A:
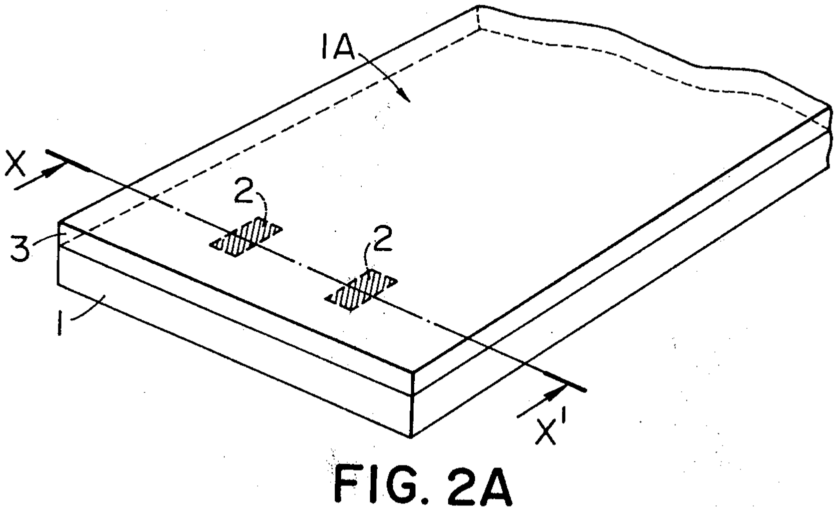
Figure 2B:
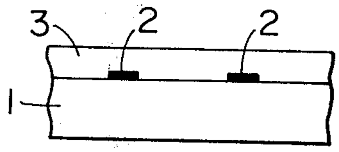
FIG. 2B is a cross-sectional view taken along a line X—X' in FIG. 2A.
Figure 3:
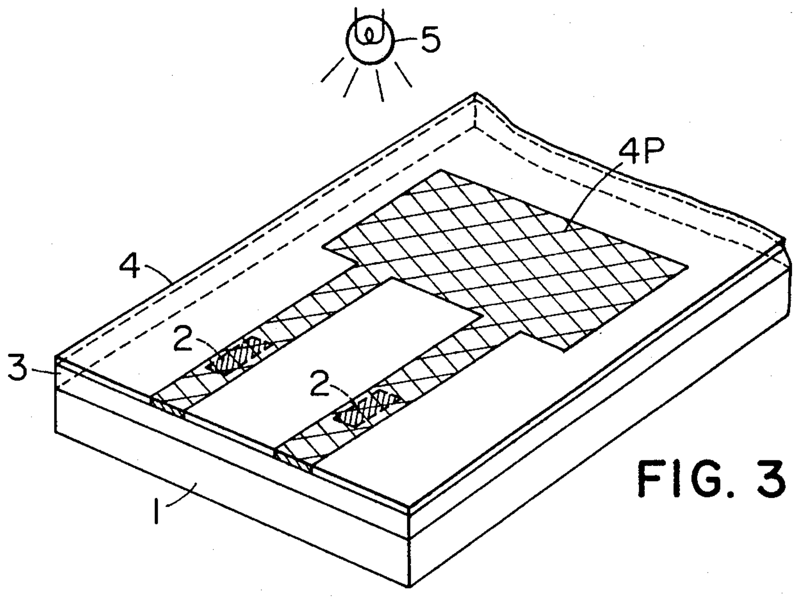

Subsequently, in FIG. 2A, the surface 1A of the substrate 1, on which the ink discharging pressure generating element 2 has been provided, is cleaned and dried, after which a dry film photo-resist 3 having a film thickness of approximately 25 to 100 microns and heated to a temperature of from 80° to 105° C. is laminated on the substrate surface 1A having the element 2 provided thereon at a rate of 0.5 to 0.4 f/min. and under a pressure of 1 to 3 kg/cm$^2$ (vide: FIGS. 2A and 2B). Thus, the dry film photo-resist 3 is firmly adhered under pressure to the substrate surface 1A, and, after its fixing, does not exfoliate from the surface even when an external pressure is applied thereto to some extent.

In the next place, a photo-mask 4 having a predetermined pattern 4P corresponding to the ink path in the ink jet head is overlaid on the dry film photo-resist 3 provided on the substrate surface 1A, and light exposure is effected over this photo-mask 4 from an appropriate light source 5. The pattern 4P corresponds to a region to constitute an ink feeding chamber, ink flow paths, and ink discharging ports to be formed thereafter. This pattern 4P does not transmit light therethrough. Therefore, the dry film photo-resist 3 of the region covered with the pattern 4P is not exposed to light, hence it remains uncured. In this instance, it is necessary that the position of the ink discharging pressure generating element 2 is registered with the abovementioned pattern 4P by a well known method. In other words, care should be taken, at least, to position the element 2 in the portion of the thin ink flow path.

Figure 4A:
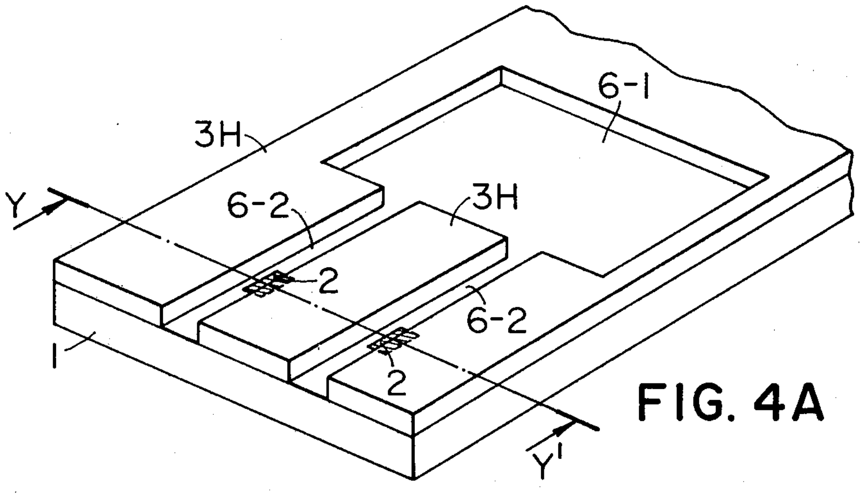
Figure 4B:
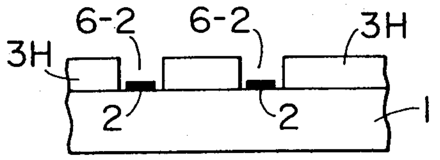
FIG. 4B is a cross-sectional view taken along a line Y—Y' in FIG. 4A.
Figure 5:
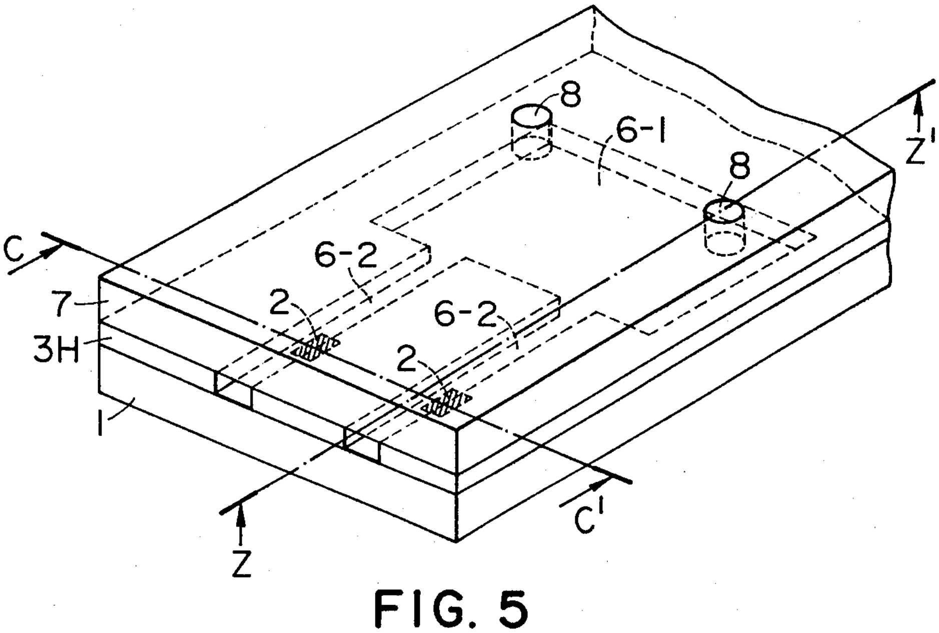

Upon exposure of the dry film photo-resist 3, the photo-resist which has been sensitized by light outside the region of the pattern 4P brings about polymerization reaction to cure and becomes insoluble in a solvent, while the photo-resist which has not been exposed is not cured and remains soluble in the solvent. After the abovementioned exposure operation, the dry film photo-resist 3 is immersed in a volatile organic solvent, e.g., trichloroethane, to dissolve and remove the unreacted (uncured) photo-resist, whereupon a recess is formed, as shown in FIG. 4A, in the cured photo-resist film 3H following the pattern 4P. Thereafter, this cured photo-resist film 3H is further subjected to curing treatment with a view to increasing its solvent-resistant property. Such further curing treatment may be done by subjecting the photo-resist film 3H to a thermal polymerization at a temperature of from 130° to 160° C. for a time period of from 10 to 60 minutes, or to ultra-violet ray irradiation, or to combination of these two treatments. Of the recessed portion defined in the cured photo-resist film 3H, the portion designated by a reference numeral 6-1 corresponds to the ink feeding chamber of the finished ink jet head, while those portions designated by a reference numeral 6-2 correspond to the thin ink flowing paths. Then, as shown in FIG. 5, a flat plate 7 is fixed to the surface of the cured photo-resist film 3H to cover the substrate on which the ink feeding chamber 6-1, thin ink flow paths 6-2 and the like have been formed through the afore-described etching process. This flat plate 7 constitutes a ceiling cover for the grooved photo-resist film. The flat plate 7 may either be simply press-attached to the cured photo-resist film 3H in a manner to be freely mountable and dismountable, or may be firmly adhered thereto with an adhesive. The adhesion may be carried out as follows: (1) an epoxy type adhesive agent is coated by a spinner in the thickness of 3 to 4 microns on the flat plate made of glass, ceramics, metals, plastics, or the like, after which the adhesive agent together with the flat plate is subjected to preliminary heating to bring the adhesive agent to the so-called "B-stage". The thus heat-treated flat plate with the adhesive is then placed on the cured photo-resist 3H to set the adhesive; or (2) a flat plate made of a thermoplastic resin such as acrylic resins, ABS resins, polyethylene and the like is fusion-bonded directly onto the cured photo-resist 3H. Incidentally, it should be noted that through-holes 8, 8 are formed in the flat plate 7 as shown in the drawing for connecting ink feeding tubes (not shown).

As stated above, after completion of joining the flat cover plate and the substrate with grooves formed thereon, the tip end part of the head (the side where the ink discharge orifice is formed) is cut along a line C—C′ in FIG. 5. This cutting along the edge line is effected to optimize the distance between the ink discharging pressure generating element 2 and the ink discharging port 9 in the thin ink flow path 6-2. The region to be cut out is arbitrarily determined in accordance with design of the ink jet head. For cutting operation, a dieing method usually adopted in semiconductor industry may be employed.

Figure 6:
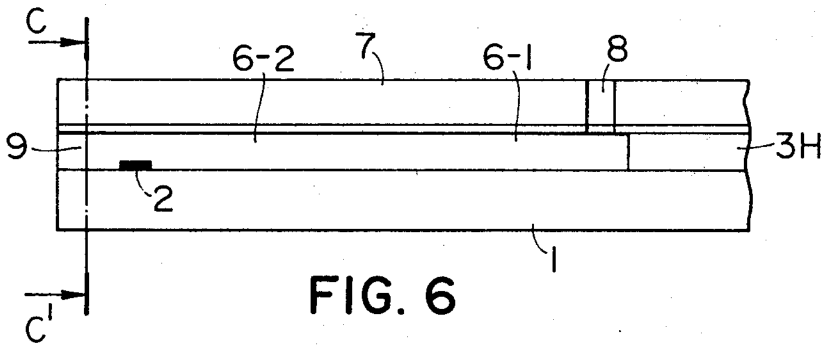
Figure 7:
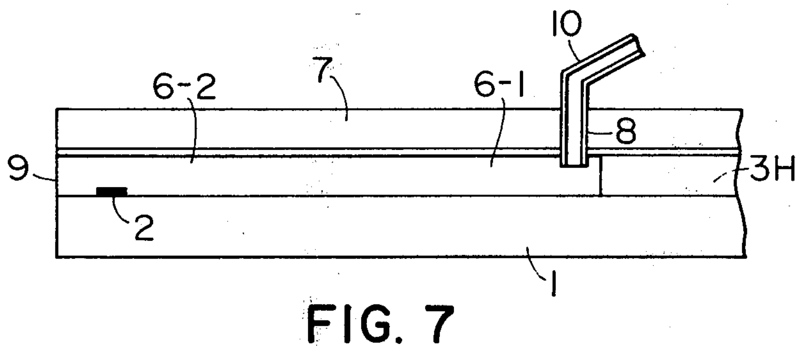

FIG. 6 is a longitudinal cross-section taken along a line Z—Z′ in FIG. 5. The cut surface is smoothed by polishing and through-holes 8 are connected to the ink feeding tubes 10 as shown in FIG. 7, whereby the ink jet head is completed.

In the above-described embodiment, a dry film photo-resist is used as the photosensitive composition for forming grooves. It should, however, be noted that the present invention is not limited to such solid material alone, but a liquid photosensitive composition may be also utilized. A coating film of the photosensitive composition in a liquid form may be formed on the substrate by a squeezing method which is used for producing a relief picture image, i.e., a method wherein a wall of the same height as a desired film thickness of the photosensitive composition is provided around the substrate, and excessive composition is removed by squeezing. In this case, viscosity of the liquid photosensitive composition preferably ranges from 100 to 300 cps. It is further necessary that the height of the wall surrounding the substrate is determined in consideration of decrease in quantity of the solvent due to vaporization thereof. In the case of a solid photosensitive composition, the film of the photosensitive composition may be adhered to the substrate under heat and pressure as explained in the foregoing. In the present invention, use of a solid photosensitive composition in film form is advantageous since the handling is convenient and easy and precise control of the film thickness is possible. Examples of such solid photosensitive composition are those photosensitive resin films manufactured and sold by DuPont de Nemour & Co. under tradenames of Permanent Photopolymer Coating RISTON, photosensitive acrylic resin compositions such as Solder Mask 730S, Solder Mask 740S, Solder Mask 730FR, Solder Mask 740FR, Solder Mask SM1, and the like, all of which are commercially available. Besides these, there may be enumerated various kinds of photosensitive compositions used in the field of ordinary photo-lithography such as photosensitive resins, photo-resists, etc. Actual examples are: diazo-resin; p-diazo-quinone; photo-polymerization type photo-polymers using, for example, a vinyl monomer and a polymerization initiator; dimerization type photo-polymers using polyvinyl cinnamate, etc. and a sensitizing agent; a mixture of o-naphthoquinone diazide and a Novolac type phenolic resin; a mixture of polyvinyl alcohol and a diazo resin; polyether type photo-polymers obtained by copolymerization of 4-glycidylethylene oxide with benzophenone, glycidylchalcone, or the like; copolymer of N,N-dimethylmethacryl amide and, for example, acrylamide benzophenone; unsaturated polyester type photosensitive resins such as APR (product of Asahi Kasei Kogyo K.K., Japan), TEBISUTA (product of Teijin K.K., Japan), Sonne (produce of Kansai Paint K.K., Japan), and the like; unsaturated urethane oligomer type photosensitive resins; photosensitive compositions composed of a photo-polymerization initiator, a polymer, and a bifunctional acryl monomer; dichromate type photoresists; non-chromium type water-soluble photo-resists; polyvinyl cinnamate type photo-resists; cyclized rubber-azide type photo-resists, and so forth.

When the resolution of the photosensitive compositions used in the present invention is so low that the desired thin ink flow path (in particular, nozzles) and the desired diameter of the ink discharging ports cannot be obtained, such portions alone may be subjected to cutting by means of a cutting machine such as a cutter for cutting silicon wafers and the like.

The effects of the present invention as explained above in detail can be enumerated as follows.

(1) Since the main process steps in the fabrication of the ink jet head rely on a so-called photographic technique, highly precise and delicate portions in the head can be formed extremely simply by use of desired patterns. In addition, a multitude of heads having the identical constructions may be worked simultaneously.

(2) The relatively less manufacturing steps result in a high productivity.

(3) Since registration among the principal structural portions constituting the head can be done easily and accurately, the ink jet head having high dimensional precision can be obtained in good yield.

(4) Multi-array ink jet heads of high density can be manufactured by a simple method.

(5) Since the depth of the groove constituting the ink flow path can be adjusted with extreme easiness, the ink path having a desired dimension can be formed depending on the layer thickness of the photosensitive (resin) composition.

(6) The ink jet heads can be manufactured continuously and in an industrialized mass-production.

(7) Since there is no necessity for using etchant (strong acids such as hydrofluoric acid and the like), the process is safe and hygienic.

(8) Since an adhesive agent is substantially unnecessary, there occurs neither clogging of the grooves (ink paths) due to flow of the adhesive agent thereinto, nor lowering in the operating function of the ink discharging pressure generating element by adhesion of the adhesive agent.

(9) Since a smooth internal wall surface of the ink paths can be formed, the ink flows smoothly therethrough to bring about no hindrance in the ink flow to be discharged from the head.

(10) Substantially the entire part of the ink flow path of the ink jet head may be formed by one and the same processing, that is, a processing essentially composed of photocuring and removal of uncured portions is sufficient without any other processing.

What I claim is:

1. An ink jet head comprising:

a substrate having at least one ink flow path for producing ink droplets and having an ink discharging pressure generating element therein, said substrate being contoured to define a groove constituting said ink flow path which groove is defined in a cured photosensitive resin.

2. An ink jet head according to claim 1, wherein said resin is a dry film photo-resist.

3. An ink jet head according to claim 1, wherein said resin is in a form of film having a thickness of 25–100 microns.

4. An ink jet head according to claim 1, wherein an ink discharging pressure generating element is disposed in said ink flow path.

5. An ink jet head according to claim 1, wherein said ink flow path is in communication with an ink discharging port.

6. An ink jet head according to claim 1, wherein a plurality of said ink paths are provided.

7. An ink jet head comprising: a substrate having at least one ink flow path for producing ink droplets and having an ink discharging pressure generating element therein, characterized in that substantially the entire ink flow path is formed by one and the same process with said ink flow path defined in a cured photosensitive resin film.

8. An ink jet head according to claim 7, wherein said ink flow path has disposed therein an ink discharging pressure generating element.

9. An ink jet head according to claim 7, wherein said ink flow path is in communication with an ink discharging port.

10. An ink jet head according to claim 7, wherein a plurality of said ink flow paths are provided.

11. An ink jet head according to claim 7, wherein said photosensitive resin film has a thickness of 25–100 microns.

12. An ink jet head having at least one ink flow path through which ink droplets are produced, said ink jet head comprising:

(1) a substrate provided with an ink discharging pressure generating element; and (2) a layer overlying the substrate provided with at least one groove for the ink flow path, said ink jet head being prepared by forming a photosensitive resin layer on the substrate, curing said layer for form cured regions according to a predetermined pattern and removing the uncured resin from said layer.

13. An ink jet head according to claim 12, wherein said resin is a dry film photo-resist.

14. An ink jet head according to claim 12, wherein said resin is in a form of film having a thickness of 25–100 microns.

15. An ink jet head according to claim 12, wherein said ink flow path has disposed therein an ink discharging pressure generating element.

16. An ink jet head according to claim 12, wherein said ink flow path is in communication with an ink discharging port.

17. An ink jet head according to claim 12, wherein a plurality of said ink flow paths are provided.

18. A method for manufacturing an ink jet head having at least one ink flow path through which ink droplets are produced which comprises: forming a photosensitive resin layer on a substrate provided with an ink discharging pressure generating element therein, producing cured regions in said layer according to a predetermined pattern, and removing uncured resin from said layer to produce a groove in the surface of the substrate constituting said ink flow path.

19. A method as set forth in claim 18, wherein said resin is a dry film photo-resist.

20. A method as set forth in claim 18, wherein said resin is in a form of film having thickness of 25–100 microns.

21. A method as set forth in claim 18, wherein said ink flow path has disposed therein an ink discharging pressure generating element.

22. A method as set forth in claim 18, wherein said ink flow path is in communication with an ink discharging port.

23. A method as set forth in claim 18, wherein a plurality of said ink flow paths are provided.

* * * * *